United States Patent
Chung

(10) Patent No.: US 7,567,970 B2
(45) Date of Patent: Jul. 28, 2009

(54) CONTENTS SEARCH SYSTEM FOR PROVIDING RELIABLE CONTENTS THROUGH NETWORK AND METHOD THEREOF

(75) Inventor: Hyun Joo Chung, Seoul (KR)

(73) Assignee: NHN Corporation (KR)

( * ) Notice: Subject to any disclaimer, the term of this patent is extended or adjusted under 35 U.S.C. 154(b) by 239 days.

(21) Appl. No.: 11/603,576

(22) Filed: Nov. 22, 2006

(65) Prior Publication Data

US 2007/0078838 A1    Apr. 5, 2007

Related U.S. Application Data

(63) Continuation of application No. PCT/KR2005/001513, filed on May 24, 2005.

(30) Foreign Application Priority Data

May 27, 2004   (KR)   ............... 10-2004-0037824

(51) Int. Cl.
*G06F 7/00*   (2006.01)
*G06F 17/30*  (2006.01)

(52) U.S. Cl. .............. 707/10; 707/1; 707/2; 707/3; 707/4

(58) Field of Classification Search ............ 707/2–3, 707/1, 4, 10
See application file for complete search history.

(56) References Cited

U.S. PATENT DOCUMENTS

| | | | | |
|---|---|---|---|---|
| 6,594,654 | B1 * | 7/2003 | Salam et al. | 707/3 |
| 7,249,124 | B2 * | 7/2007 | Sasaki et al. | 707/3 |
| 7,266,546 | B2 * | 9/2007 | Son | 707/3 |
| 7,302,467 | B2 | 11/2007 | Matsuda et al. | |
| 2002/0103806 | A1 * | 8/2002 | Yamanoue | 707/100 |
| 2003/0009497 | A1 | 1/2003 | Yu | |
| 2003/0101166 | A1 * | 5/2003 | Uchino et al. | 707/2 |

(Continued)

FOREIGN PATENT DOCUMENTS

JP   2001-357035   12/2001

(Continued)

OTHER PUBLICATIONS

"Epidemic Algorithms for reliable Content-Based Publish-Subscribe: An Evaluation—"Paolo Coata, Matteo Migliavacca, Gian Pietro Picco and Gianpaolo Cugola—Distributed Computing Systems, 2004, Proceedings 24th International Conference on IEEE-2004 (p. 552-561).*

(Continued)

*Primary Examiner*—John E Breene
*Assistant Examiner*—Anh Ly
(74) *Attorney, Agent, or Firm*—Knobbe, Martens, Olson & Bear, LLP

(57) ABSTRACT

Disclosed is a contents search system and method for providing reliable search results. In the method, search results are identified by searching contents for information that pertains to a query word inputted from a user via the network are searched. Then, a degree of reliability of the search results is determined in consideration of at least one evaluation variable, and the search results are provided to the user according to the determined degree of reliability. With this configuration, reliable search results can be identified among contents posted on a network.

19 Claims, 5 Drawing Sheets

U.S. PATENT DOCUMENTS

| | | | |
|---|---|---|---|
| 2003/0120649 A1* | 6/2003 | Uchino et al. ................... | 707/5 |
| 2003/0167263 A1* | 9/2003 | Sasaki et al. .................... | 707/3 |
| 2003/0187834 A1* | 10/2003 | Oda et al. ....................... | 707/3 |
| 2003/0220922 A1* | 11/2003 | Yamamoto et al. ............. | 707/7 |
| 2004/0068495 A1* | 4/2004 | Inaba et al. ..................... | 707/3 |
| 2004/0153444 A1* | 8/2004 | Senders et al. ................. | 707/3 |
| 2004/0267734 A1* | 12/2004 | Toshima ......................... | 707/3 |
| 2007/0050346 A1* | 3/2007 | Goel et al. ...................... | 707/3 |

FOREIGN PATENT DOCUMENTS

| | | |
|---|---|---|
| JP | 2003-006221 | 1/2003 |
| KR | 10-2002-0007742 | 1/2002 |
| KR | 10-2004-0008065 | 1/2004 |

OTHER PUBLICATIONS

"XNET: A Reliable Content-Based Publish/Subscribe System"—Chand, R & Felber, P.—Reliable Distributed Systems, 2004, Proceedings of the 23$^{rd}$ IEEE International Symposion—IEEE Oct. 18-20, 2004 (pp. 264-273).*

International Search Report and Written Opinion of ISA dated Aug. 17, 2005 for PCT/KR2005/001513 filed on May 24, 2005.

* cited by examiner

CONTENTS SEARCH SYSTEM FOR PROVIDING RELIABLE CONTENTS THROUGH NETWORK AND METHOD THEREOF

CROSS REFERENCE TO RELATED APPLICATIONS

This application is a continuation of PCT International Application Number PCT/KR2005/001513, filed on May 24, 2005, designating the United States of America and published in the English language, which claims priority under 35 U.S.C. § 119 to Korean Application Number 10-2004-0037824 filed on May 27, 2004. The disclosures of the above-referenced applications are hereby expressly incorporated by reference in their entireties.

TECHNICAL FIELD

The present invention relates to a contents search system and method, and more particularly, to a system and method for searching contents provided through a network.

BACKGROUND ART

Recently, with the rapid spread of the Internet all over the world, various types of electronic commerce targeted at people throughout the world have been conducted through a homogeneous medium called the Internet. Also, communications in various forms have been conducted through the Internet.

In addition to electronic mail and file transmission, which are the most basic communication forms using the Internet, Internet telephony has been used as a substitution for wired telephony. Also, with the use of the Internet, a short message can be transmitted to a mobile telephone, and a variety of chatting types including character chatting, voice chatting, and video chatting, which are multilateral communications, have been conducted. Moreover, communities in which a plurality of users can exchange data, opinions, and the like have been activated.

Various forms of communities such as cafes, blogs, homepages, clubs, and mini-homepages exist, each of which includes various contents. Generally, users who have subscribed as members in a café or club communicate with each other by putting contents such as data or information about a certain subject on a bulletin board of the café or club. In the case of a blog, mini-homepage, and the like, the user who has established it posts his/her opinions or data.

Conventionally, it has been troublesome for a user to see or access desired contents contained in such communities, in that the user must access the communities directly and search for the contents. However, by virtue of recent developments of search technology, a query word can be inputted on a web browser, and information of a variety of forms, including web documents, news, images, and online dictionaries are searched for the query word. In addition, subject matters and user entries in online communities such as messageboards, café s, blogs, and the like can be included in the search. Thus, the user can easily search for the contents contained in the communities without separately accessing the communities and can easily find communities containing subject matters related to the query word.

However, there are a great number of contents not containing information worthy of reference among searched contents. Particularly, communities have a lot of undesired contents. For example, in some communities, users can post statements reflecting their thinking, feeling, or the like, in the form of a "reply" to the posted contents. Even when such posted contents do not contain information worthy of reference they may be searched and provided in the search results. In a case where contents in categories such as web documents, news, and the like, in addition to a community category, are searched, there are many cases where unnecessary information is contained in the contents of the searched web documents and in the search results provided to the user.

Further, typically when communities are searched for subject matters containing a query word, search results are arranged based only on scales such as the number of members and the number of posts of the searched communities.

In this way, conventionally, search results include all results containing the query word regardless of the reliability of the information included in the contents. Therefore, the conventional contents search method has a disadvantage in that there is a high possibility that unnecessary contents are searched and unreliable search results are provided to users. Accordingly, it is very difficult for a user to find reliable contents related to his query word amongst the numerous unreliable search results provided.

DISCLOSURE

Technical Problem

In order to solve the above-mentioned problems, embodiments of the present invention search for reliable contents among contents provided on a network and provide users with the reliable contents.

In addition, other embodiments of the present invention determine degrees of reliability of search results indicating how much information contained in the searched results is reliable and to provide users with search results based on the determined degrees of reliability.

Technical Solution

To achieve the above objectives, an aspect of the present invention provides a method for searching contents provided on a network, the method including the steps of a) searching contents for search results containing information pertaining to a query word inputted by a user via the network; b) determining degrees of reliability of the search results in consideration of at least one evaluation variable; and c) providing the user with the search results according to the determined degrees of reliability.

According to another aspect, the present invention provides a system for searching contents provided on a network, the system being connected to a plurality of user terminals via the network and including a search unit for searching contents for search results containing information pertaining to a query word inputted by a user via the network; a reliability measurement unit for determining degrees of reliability of the search results; and a search result provision unit for providing a user terminal of the user with the searched contents according to the determined degrees of reliability.

According to yet another aspect, the present invention provides a method for searching contents provided on a network, the method including the steps of a) searching contents for first search results containing information that pertains to a query word inputted by a user via the network; b) determining evaluation variables to be considered for the contents search; c) extracting second search results from the first search results, the second search results satisfying a condition set by at least one of the determined evaluation variables; d) determining degrees of reliability of the extracted second search results; and e) arranging the second search results according to the determined degrees of reliability and providing the user with the arranged second search results.

MODE FOR INVENTION

Figure 1:
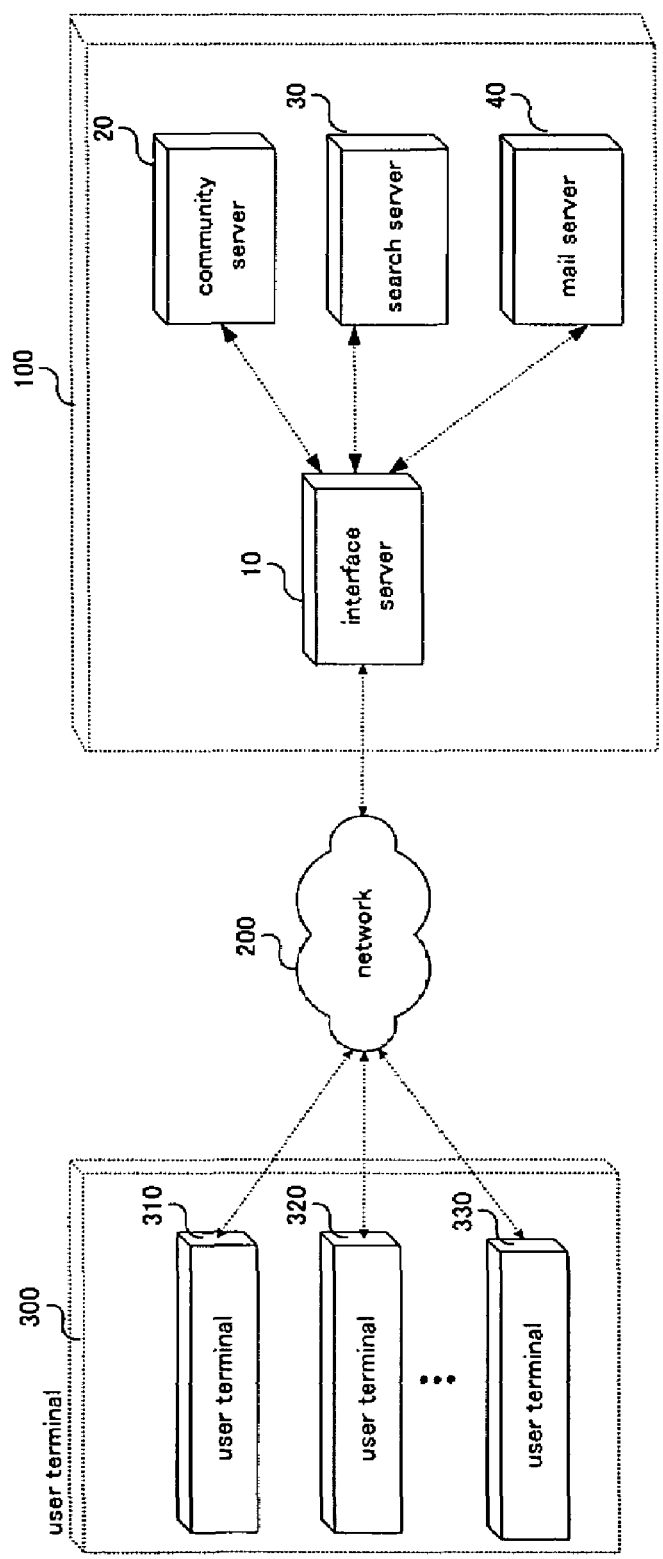
FIG. 1 is a diagram illustrating a configuration of a networked contents search system according to an embodiment of the present invention.

Hereinafter, embodiments of the present invention will be illustrated in detail with reference to the accompanying drawings. However, it should be understood that the present invention is not restricted in the embodiments and may be modified or changed in various forms without departing from the spirit and scope of the invention as set forth in the annexed claims.

In embodiments of the present invention, a query word is submitted by a user, and contents are searched for search results pertaining to the query word. The degrees of reliability of the search results are assessed and reliable search results are provided to the user. In some embodiments, all of the search results are provided to the user, wherein the degrees of reliability of the search results are indicated. In other embodiments, all of the search results are provided to the user, wherein the search results are ordered by their degrees of reliability. In still other embodiments, a subset of the search results which were determined to be more reliable than other search results are provided to the user.

In a method for providing users with reliable search results, search results pertaining to the query word are first identified, and a degree of reliability is assigned to at least one search result according to a degree of satisfaction of conditions set by evaluation variables of the searched contents, and then the search results are selected or arranged according to the degree of reliability, and they can be provided to the users. For example, a search result page can be provided to the user, which includes the search results arranged sequentially according to their degree of reliability, or a search result page can include only contents with more than a predetermined degree of reliability.

In the present invention, the evaluation variables that can be used to determine the degrees of reliability of the contents include the following variables.

1. Characteristics of users who post contents

User's characteristics include factors such as age, occupation, residential area, and reliance index. This can determine a degree of reliability of contents based on statistical results that users over a certain age or users engaged in specific occupations, such as professionals, post more reliable information. Accordingly, in some embodiments, processes are performed which classify contents according to users' age, occupation, or residential area, evaluating a degree of reliability of information contained in the classified contents, and thereby determine ages or occupations of users who provide more reliable contents. This process can be performed in advance.

User's reliance index is a value obtained by determining a degree of reliability of information that is posted by each user. Such user's reliance index can be a value determined according to how frequently the user's contents are used or viewed by other users. For example, a reliance index of a first user can be determined based on how frequently other users remove contents posted by the first user (for example, the number of removed contents) or based on the number of second users who form a relationship with the first user's community (for example, the number of neighbored users).

Also, the user's reliance index can be a value determined according to a user's network activity. For example, a network activity may include a response to a query made by the user through the Internet in a knowledge sharing service and the like. In this case, the user's reliance index can be calculated according to the number of replies to the query and the number of adoptions of provided replies (reply adoption rate), for example.

2. Degree of use of contents

A degree of use of contents indicates how many users respond to and use contents. Variables that can indicate how frequently contents are responded to and used include the number of times by which contents are recommended to users (the number of recommendations), the number of times by which users post replies to contents (the number of replies), the number of times by which users post talkbacks to contents (the number of talkbacks), the number of times by which contents are sent via email (the number of emails), the number of times contents are output (for example, printed) (the number of contents outputs), and the like. Here, a talkback refers to annexing a reply to a posted content at the sight of a post and it can be called by various names (for example, footer, comments, and reply in one line) according to service providers. In addition, the variables used can include the number of times all actions occur, which can be counted when users click contents.

3. Annexation of additional information to contents

Annexation of additional information to contents indicates whether or not separate additional information such as an image, moving picture, audio, and the like, in addition to text information, is annexed into contents.

4. Size of contents

The size of contents can indicate an amount of information that contents have, such as the number of bytes of the contents. This is based on an empirical fact that the larger the contents are, the more information it contains.

As described above, in the present invention, contents are searched for an inputted query word in consideration of at least one of evaluation variable, such as the characteristics of the user who posted the contents, the degree of use of the contents, the frequency of annexation of additional information to the contents, the size of the contents, and the like. However, it should be understood that the evaluation variables used to determine a degree of reliability of contents in the present invention are not restricted to those mentioned above.

Communities in which contents searched by such evaluation variables are posted may include all forms of communities that can occur on a network. For example, the communities may include a common community (for example, a messageboard, a café or a club) in which a plurality of users subscribe as members and exchange data or opinions about the same subject, and an individual community (for example, a blog, individual homepage, mini-homepage, or profile) managed by an individual, in which contents such as data and opinions are posted.

In addition, contents according to the present invention also include contents belonging to all categories (for example, web documents, news, dictionaries, and images) provided in a network, in addition to postings contained in the common and individual communities. In the following embodiments, a system and method for searching contents will be described on the basis of contents posted in a community for the convenience of explanation. However, it should be understood that the present invention is not restricted in searching contents contained in the community.

Now, a detailed configuration and operation of a contents search system over a network according to the present invention having the above-mentioned characteristics will be described.

Figure 2:
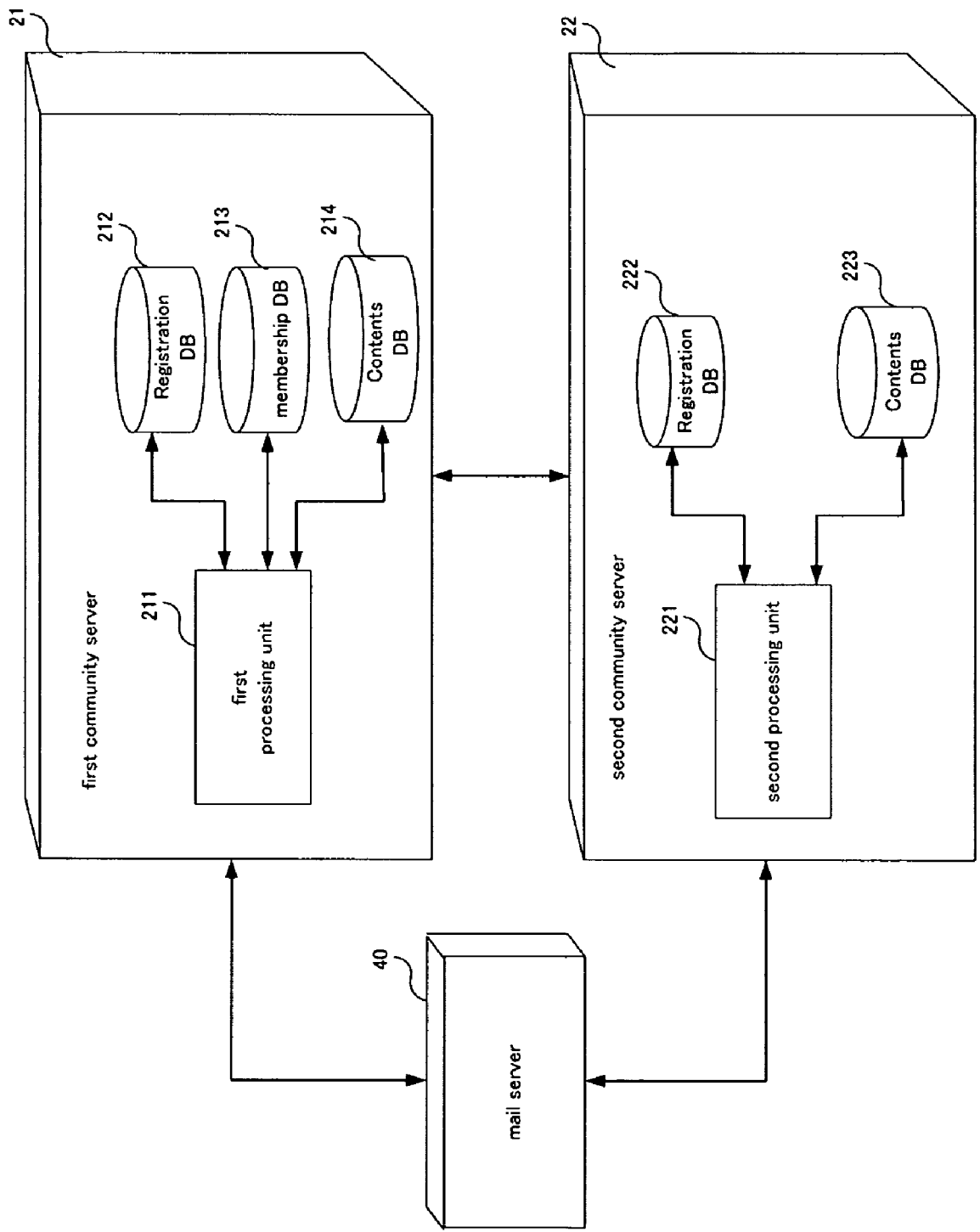
FIGS. 2 and 3 are diagrams illustrating a detailed configuration of each server in the contents search system of FIG. 1.
Figure 3:
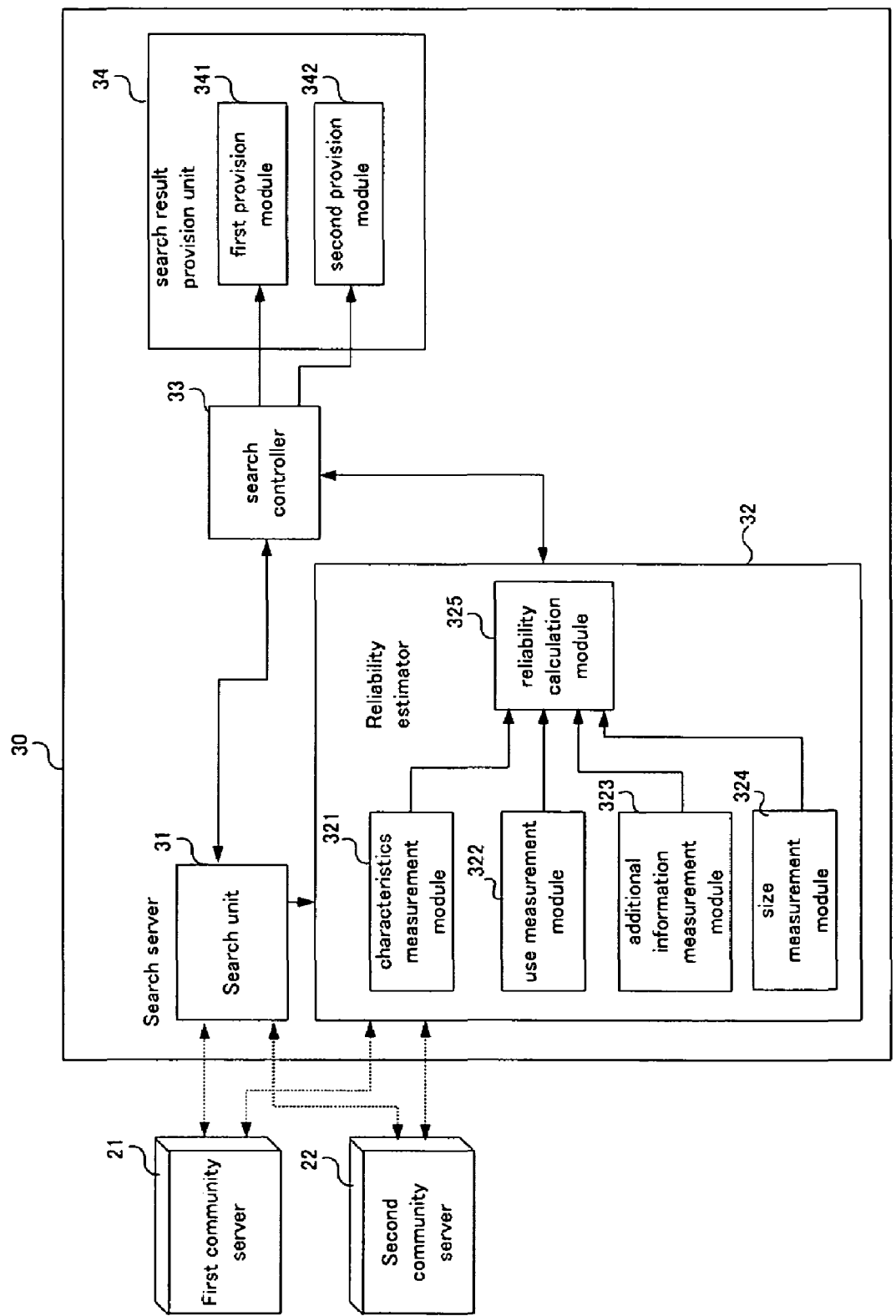

FIG. 1 illustrates a configuration of a contents search system over a network (hereinafter, abbreviated as "contents search system") according to an embodiment of the present invention. FIGS. 2 and 3 illustrate detailed configurations of each server.

A contents search system 100 according to an embodiment of the present invention provides users with search services through the Internet, wireless communication networks, and the like. As shown in FIG. 1, this system 100 is connected to a plurality of user terminals 310, 320, 330, . . . , (hereinafter, generally referred to as "300" for the sake of convenience) via a network 200 (including various forms of networks such as telephone networks, Internet, wireless communication networks, and the like).

The user terminals 300 are communication devices that can access the contents search system 100 through the network 200, including, for example, various communication devices such as wired telephones, mobile communication terminals, computers, and Internet-accessible televisions. Accordingly, users can conveniently and quickly access the contents search system 100, for example, by using personal computer communications, Internet, wireless Internet, and telephone networks.

The contents search system 100 connected to the user terminals 300 can provide a plurality of users with contents retrieval services and includes an interface server 10, a community server 20, a search server 30, and a mail server 40.

The interface server 10 allows the plurality of user terminals 300 to access the system 100 via the network 200, particularly, the Internet or the wireless Internet. In addition, the interface server 10 serves as a kind of WEB server or WAP (wireless application protocol) server to perform a function of converting various information received from each server 20 to 40 in compliance with a communication standard and providing the converted information to the plurality of user terminals 300, or a function of receiving information from the user terminals 300 via the network 200 and providing the received information to each server 20 to 40.

The community server 20 provides services related to communities, and includes a first community server 21 for providing and managing common communities and a second community server 22 for providing and managing individual communities, as shown in FIG. 2.

Each community server 21 and 22 includes databases, in which information related to the communities is stored, and a processing unit for creating and managing communities between users based on the information stored in the databases.

More specifically, the first community server 21 includes a first processing unit 211 for creating common communities and managing contents, a registration database 212 in which general information related to characteristics of common communities is stored, a membership database 213 in which information related to users subscribed as members to common communities is stored, and a contents database 214 in which contents of common communities are stored.

The registration database 212 stores the information about the common communities registered for each category. For example, the registration database 212 stores identification codes of common communities correspondingly, which are registered for a category code given for each category such as broadcasting, entertainment, economy, and politics. In addition, in the registration database 212, community information, such as names of common communities, descriptions of characteristics of common communities, information related to common community operators (IDs, nicknames, and the like), the number of members, and registration data is stored for each of identification codes of common communities.

The member database 213 stores information regarding users who are registered to common communities (aliases, member information). For example, the member database 213 stores membership information such as ID, nickname, password, age, sex, occupation, and email address of users subscribed as members corresponding to identification codes of common communities.

The contents database 214 stores information related to the contents provided for each common community. For example, the contents database 214 stores information such as the number of posted contents, the IDs of the users who posted the contents, the dates of posted contents, the titles of posted contents, and the substances of posted contents corresponding to identification codes of common communities. In addition, the contents database 214 stores the number of replies to contents, the number of talkbacks, the number of emails sent, the number of recommendations, and the like for each of the contents.

The first processing unit 211 creates and manages the common communities on the basis of the databases 212 to 214 in which the above-mentioned information is stored. Specifically, the first processing unit 211 creates and registers the common communities, performs user's authentication, and performs contents posting and management for each common community.

On the other hand, the second community server 22 provides and manages individual communities for each user and can be named a 'blog server', for example. As shown in FIG. 2, the second community server 22 includes a second processing unit 221 for creating individual communities and managing contents, a registration database 222 in which information related to registered individual communities is stored, and a contents database 223 in which contents posted by users for each individual community are stored.

The registration database 222 stores general information related to individual communities registered for each category. For example, the registration database 222 stores identification codes of individual communities registered for each category, user information such as names of individual communities, IDs, nicknames, age, sex, and occupation of users who have established individual communities, and community information such as registration date for each individual community.

The contents database 223 stores information related to contents provided for each individual community. For example, the contents database 223 stores information such as the number of posted contents, the dates of posted contents, the titles of posted contents, and the substances of posted contents, corresponding to identification codes of individual communities. In addition, the contents database 223 stores the number of replies, the number of talkbacks, the number of emails sent, the number of recommendations, and the like for each of the contents.

The second processing unit 221 creates and registers individual communities and performs contents posting and management for each individual community.

In the community servers 21 and 22 with the above-described configuration, when users other than a user who posted the contents annex replies or talkbacks to the contents, each of the processing units 211 and 221 increase the number of replies or talkbacks of contents. In addition, when a user recommends the contents to other users, each of the processing units 211 and 221 increases the number of recommendations of contents.

In addition, the first community server 21 can be associated with the second community server 22 to share the contents. For example, a user can request that contents posted in a common community be posted in his/her individual community through a menu such as "putting contents into basket". In this case, the first processing unit 211 of the first community server 21 copies the contents and transmits the copied contents to the second community server 22. Then, the second processing unit 221 of the second community server 22 posts the contents in the user's individual community. At this time, information related to sources of the contents may be exposed when the contents are posted in the individual community.

On the other hand, the mail server 40 performs a function of sending the contents of the community to a specific user's email address in conjunction with the first or second community server 21 or 22 at a request of the user. The first or second community server 21 or 22 provides a function of allowing the mail server 40 to send the contents to the specific user's email address (for example, email sending). When the user selects the function, the first or second community server 21 or 22 calls the mail server 40 and requests the mail server 40 to send an email of contents to the user. Then, the mail server 40 receives an email address of the user from the user, sends the contents to the email address, and informs the community server 21 or 22 in which the contents are posted of the fact of sending the contents. Upon completing the email sending, the community server 21 or 22 increases the number of the contents email sent.

The search server 30 for searching the contents posted in the community according to a query word provided from the user terminals 300 includes a search unit 31 for identifying search results by searching contents containing the query word, a reliability measurement unit 32 for determining degrees of reliability of the search results, a search controller 33 for controlling the search of the search unit 31 and the reliability determination of the reliability measurement unit 32, and a search result provision unit 34 for providing a user with search results provided by the search unit 31, as shown in FIG. 3.

The reliability measurement unit 32 determines degrees of reliability of search results obtained by the search unit. To this end, the reliability measurement unit 32 includes a characteristics measurement module 321 for determining characteristics of a user who posted the contents, an availability measurement module 322 for determining availability of contents, an additional information measurement module 323 for determining whether or not additional information of the contents is annexed, a size measurement module 324 for determining a size of the contents, and a reliability calculation module 325 for determining a degree of reliability of the contents based on determination results of the measurement modules 321 to 324, as shown in FIG. 3. Here, the measurement modules 321 to 324 can be used selectively according to evaluation variables used. In addition, if different evaluation variables, in addition to the above-mentioned evaluation variables, are also used, additional measurement modules for determining the different evaluation variables may be added.

The search controller 33 controls the search unit 31 and the reliability measurement unit 32 to search the contents. Particularly, the search controller 33 drives the measurement modules 321 to 324 selectively according to set evaluation variables. For example, when all of the above-mentioned four variables (user's characteristics, availability of contents, annexation of additional information to contents, size of contents) are set as evaluation variables to be considered for the search of the contents, the search controller 33 drives all of the measurement modules 321 to 324 within the reliability measurement unit 32 to determine a degree of reliability of the contents. If only one of the four variables is set as an evaluation variable, the search controller 33 drives only a corresponding measurement module to determine a degree of reliability of the contents. Then, the search controller 33 sends the searched contents to the search result provision unit 34.

The search result provision unit 34 creates a search result page based on the search results provided from the search controller 33 and provides a user with the created search result page. The search result provision unit 34 includes a first provision module 341 for arranging the search results at random and providing the user with the arranged contents, and a second provision module 342 for arranging the search results according to a degree of reliability of the contents and providing the user with the arranged contents. The second provision module 342 can also select only search results of which the degree of reliability is greater than a prescribed degree of reliability and provide the user with the selected search results, which can also be arranged according to their degree of reliability.

In the embodiments of the present invention, the first and second community servers 21 and 22 are incorporated in a single system. However, it should be understood that the servers can also be incorporated in different systems separately. For example, they can be implemented in such a manner that the first system includes only the first community server to provide a common community service and the second system includes only the second community server to provide an individual community service. In addition, in the embodiments, the databases and the processing units 211 and 221 in the servers 21 and 22 may be implemented as separate servers to process corresponding functions, and each database can be integrated into a single server. In the present invention, the databases were classified as described above for convenience of explanation. However, it should be understood that the databases are not restricted to such a classification.

Next, a method for searching contents over a network according to an embodiment of the present invention will be described on the basis of the above-described configuration.

Figure 4:
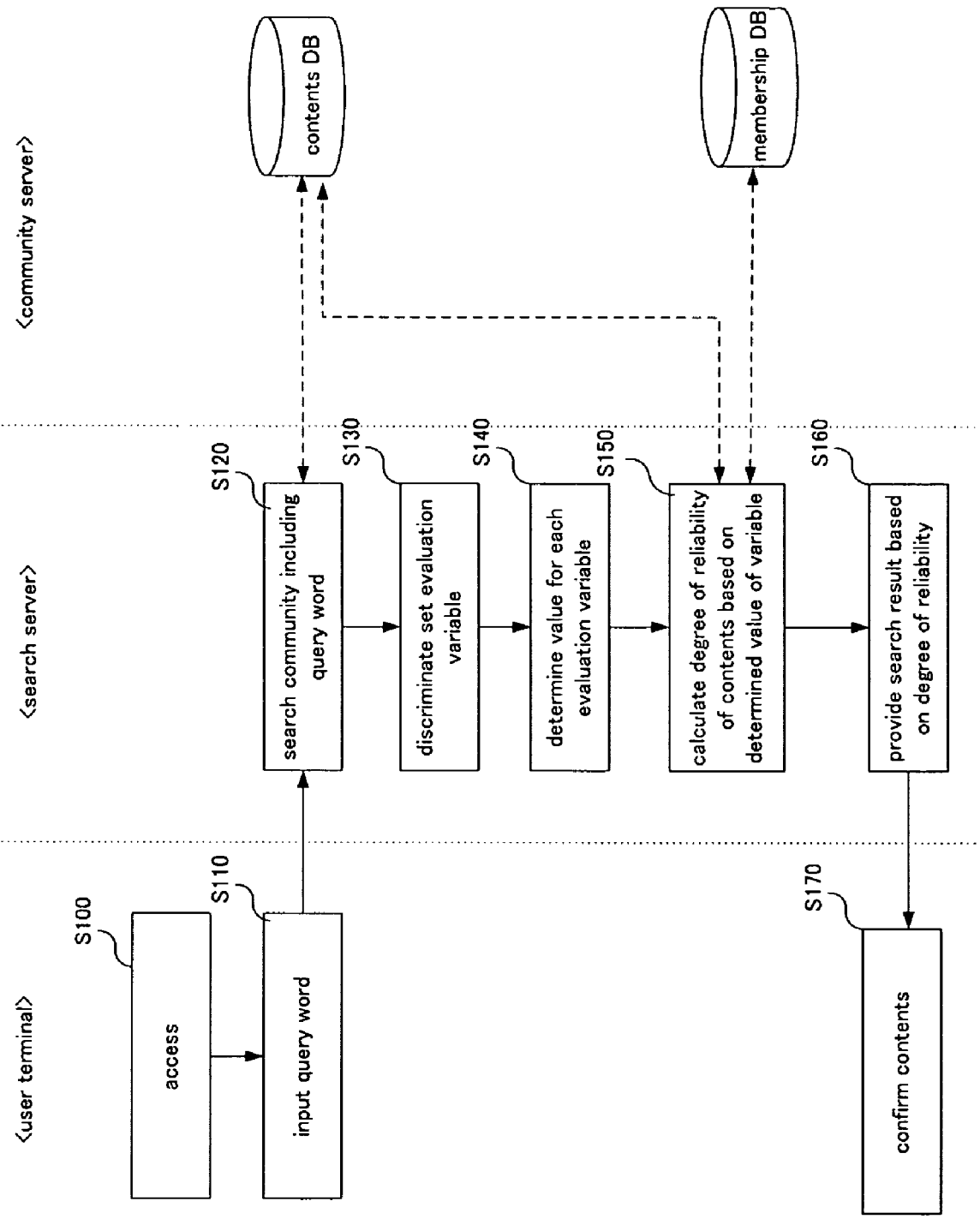
FIG. 4 is a general flowchart illustrating a contents search method according to an embodiment of the present invention.

FIG. 4 is a general flowchart illustrating a contents search method according to an embodiment of the present invention.

As shown in FIG. 4, in order for a user to search desired contents using his/her terminal 300, the user accesses the search server 30 directly by executing a user program provided by the interface server 10, or accesses the interface server 10 directly through a web browser and then inputs a query word corresponding to the desired contents. In this case, the user may access an initial webpage of the system through the interface server 10, access a certain web page providing a community service, and input the query word in the community service web page (S100 and S110).

The query word inputted by the user is transmitted to the search server 30, and then the search server 30 searches contents based on the inputted query word.

First, the search server 30 finds contents containing the inputted query word. That is, the search server 30 finds search results by identifying contents containing information that accords with the inputted query word among contents stored in the contents databases 214 and 223 of the first and second servers 21 and 22 (S120). Generally, contents posted in communities consist of title and substance. Here, the search server 30 searches the contents by determining whether or not information that accords with the query word is contained in the contents by referring to titles and substance of the contents respectively.

Next, degrees of reliability of the search results are determined. In this embodiment of the present invention, the search server 30 obtains values of the evaluation variables set for the search of the contents and calculates degrees of reliability of the search results based on the obtained values of the evaluation variables. That is, with one or more evaluation variables of user's characteristics, availability of contents, annexation of additional information to contents, and size of contents set as evaluation variables to be considered for the search of the contents, the search server 30 obtains values of the set evaluation variables and calculates degrees of reliability of the search results based on the obtained values (S130 to S150).

Here, considering the values determined for each evaluation variable, in a case where age in a user's characteristics is set as an evaluation variable, a determination value is age of the user who posted the contents. In a case where availability of contents is set as an evaluation variable, a determination value may be the number of replies, the number of talkbacks, the number of emails sent, user's reliance index, or the like. In addition, in a case where annexation of additional information to contents is set as an evaluation variable, a determination value may be a kind of information additionally annexed to the contents (for example, image, moving picture, or audio file), and in a case where a size of contents is set as an evaluation variable, a determination value may be a size of searched contents (the number of bytes, and the like).

As described above, when a degree of reliability of search results is calculated based on the determination values for the evaluation variables, the search results can be provided to the user arranged by their degrees of reliability (S160 and S170).

Next, search steps (S120 to S160) in the search process will be described in more detail.

Figure 5:
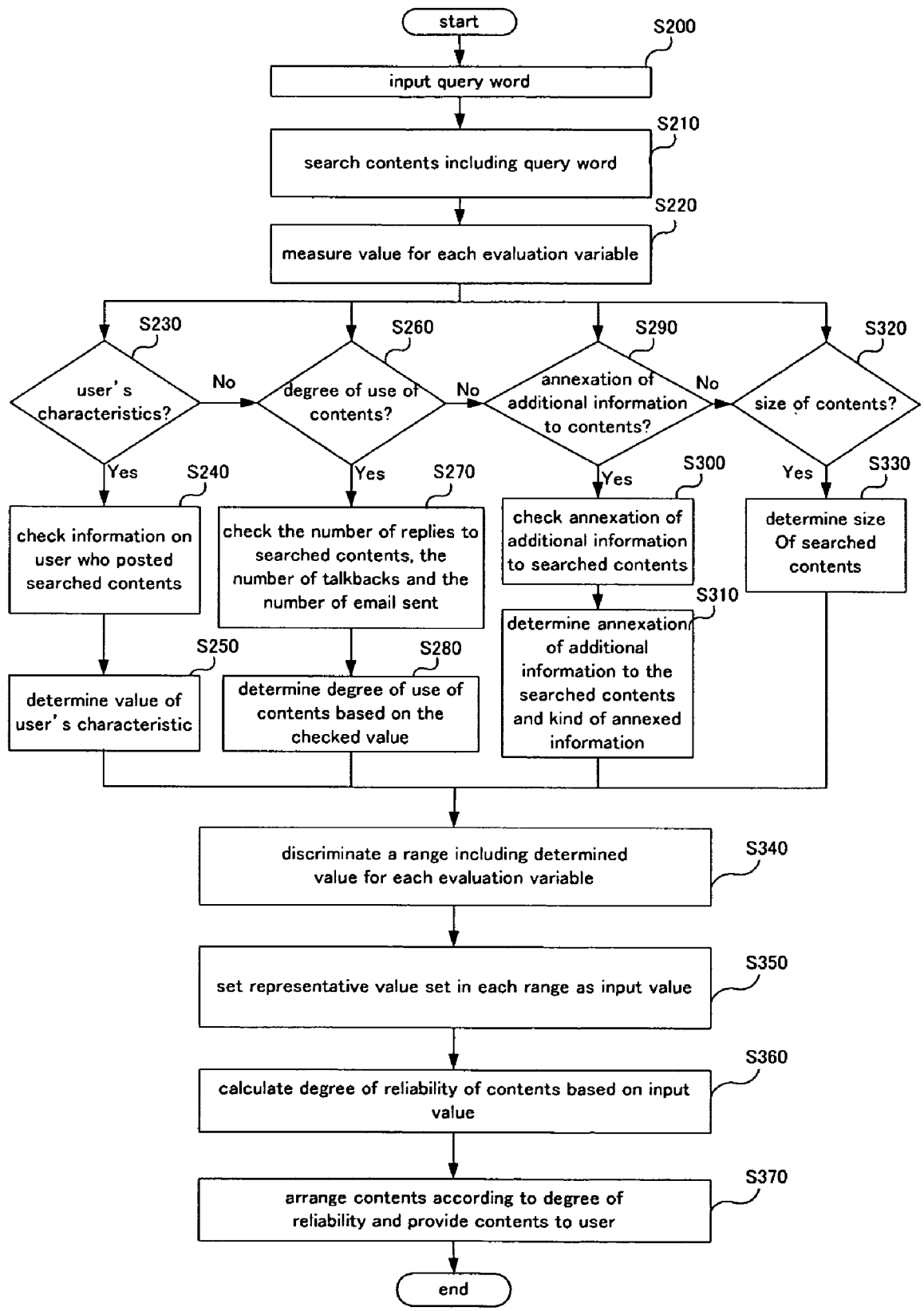
FIG. 5 is a detailed flowchart illustrating a search step shown in FIG. 4.

FIG. 5 is a detailed flowchart illustrating a search process of the search server.

As shown in FIG. 5, when a query word is provided, the search controller 33 of the search server 30 drives the search unit 31 to search contents containing information corresponding to the query word. The search unit 31 finds search results containing the query word by searching the contents databases 214 and 223 of the community servers 21 and 22 and transmits the search results to the reliability measurement unit 32 (S200 and S210). In this case, the search unit 31 can search contents selectively according to frequency of the queried word and indicate how many words that accord with the query word are contained in the contents, or a degree of accordance with the query word.

Next, the search controller 33 drives the measurement modules 321 to 324 of the reliability measurement unit 32 selectively according to the set evaluation variables (S220). For example, in a case where only the user's characteristics is set as an evaluation variable to be considered for the search, the search controller 33 drives the characteristics measurement module 321 only. In a case where only availability of contents is set as an evaluation variable, it drives the availability measurement module 322 only. Also, in a case where only annexation of additional information to contents is set as an evaluation variable, it drives the additional information measurement module 323 only, and, in a case where only a size of contents is set as an evaluation variable, it drives the size measurement module 324 only. In addition, in a case where two or more evaluation variables are set, it drives two or more corresponding modules. In the case where two or more evaluation variables are set, the search controller can drive the corresponding modules simultaneously or sequentially to search the contents.

Each of the measurement modules 321 to 324 of the reliability measurement unit 32 determines a value corresponding to a corresponding evaluation variable.

More specifically, in a case where age among the user's characteristics is set as an evaluation variable, the characteristics measurement module 321 determines the users' age by searching the membership database 213 and/or the registration database 222 based on IDs of the users who posted the contents searched by the search unit 31. In addition, in a case where occupation among the user's characteristics is set as an evaluation variable, the characteristics measurement module 321 determines the user's occupation by searching the membership database 213 and/or the registration database 222 as described above.

In addition, in a case where a user's reliability index among the user's characteristics is set as an evaluation variable, the characteristics measurement module 321 finds contents posted by the user from the contents databases 214 and 223 of the community servers 21 and 22 and determines the user's reliability index based on the number of contents that have been removed. Alternatively, the characteristics measurement module 321 can determine the number of other users, that is, the number of neighbored users forming a relationship with communities that the users subscribed to or established, by searching the registration databases 212 and 222 of the community servers, and may determine the users' reliance index based on the determined number of other users. In addition, the characteristics measurement module can determine the users' reliance index in various ways (S230 to S250).

On the other hand, in a case where availability of contents is set as an evaluation variable, the availability measurement module 323 determines the availability of the contents based on the number of replies, the number of talkbacks, and/or the number of emails sent that are stored correspondingly for each of the contents searched by referring to the contents databases 214 and 223 (S260 to S280).

In addition, in a case where annexation of additional information to contents is set as an evaluation variable, the additional information measurement module 323 finds contents containing the query word by searching the contents databases 214 and 223 of the community servers 21 and 22, confirms whether or not additional information such as an image, moving picture, or audio in addition to text is contained in the found contents, and discriminates the kind of annexed additional information (S290 to S310).

Further, in a case that a size of contents is set as an evaluation variable, a size measurement module 324 finds contents containing the query word by searching the contents databases 214 and 223 of the community servers 21 and 22 and determines the size of the found contents (the number of bytes and the like) (S320 to S330).

As described above, the values determined in the measurement modules 321 to 324 of the reliability measurement unit 32 are provided to the reliability calculation module 325, and then the reliability calculation module 325 calculates a degree of reliability of a search result based on the determined values corresponding to the set evaluation variables, respectively.

That is, the degree of reliability of a search result is calculated based on the determined values corresponding to at least one of evaluation variables of user's characteristics, availability of contents, annexation of additional information to contents, size of contents, and the like.

Various methods can be used to calculate a degree of reliability of the contents. In this embodiment, a reliability generating function is set. The reliability generating function calculates a degree of reliability of search results based on weights according to an input value set based on the determined values for each evaluation variable. Here, input values inputted to the reliability creation function may be determined values for each evaluation variable or may be different values.

Particularly, in the embodiment of the present invention, a plurality of setting ranges having representative values for evaluation variables are given, and a representative value of a setting range to which the determined values for each evaluation value belong is set as an input value of the reliability generating function. For example, in a case where an age from the user's characteristics is set as an evaluation variable, a representative value may be given as "10" if a user is a teenager, a representative value may be given as "50" if the user is in their twenties, and a representative value may be given as "100" if the user is in their thirties. In this case, if a determined age of the user is the twenties, an input value is set as "50".

On the other hand, in a case where a size of contents is set as an evaluation variable, representative values may be proportionally given for contents in which sizes are more than a set value within a maximal limit. For example, in a case that 500 bytes are set as a maximal limit of a size of contents, if a size of given contents is 500 bytes, the highest representative value is given to the contents, and if a size of given contents exceeds 500 bytes, a lower representative value is given to the contents. This is to consider the fact that an excessive amount of contents may contain more undesired information (S340 and S350). However, it should be understood that the method of calculating degrees of reliability of the search results is not limited to the above-described method.

In this way, after representative values are set according to ranges in which the determined values for the evaluation variables are contained and the set representative values are set as input values of the reliability generating function, weights provided based on the input values are applied to the reliability generating function to calculate a degrees of reliability of the search results. However, it should be understood that the reliability calculation method according to the present invention is not limited to the above-described method. For example, another method of calculating a degree of reliability of the contents by summing all determined values for the evaluation variables may be used.

Next, the degrees of reliability of search results determined by the reliability measurement unit 32, along with the searched results by the search unit 31, are transmitted to the search result provision unit 34.

The search result provision unit 34 selects only search results having more than a prescribed degree of reliability based on the degrees of reliability of the search results, and then, based on the selected contents, generates a search result page to be provided to a user. Alternatively, the search result provision unit 34 generates a search result page in which the search results are arranged in an order of a higher degree of reliability and provides the generated search result page to the user. Alternatively, the search result provision unit 34 may generate a search result page in which the search results are arranged at random.

The search result page may contain titles, parts of the substance, creators, creation dates, sources, and the like of the contents, and in addition, if image files or the like are annexed to the contents, a separate icon may be used to indicate the file annexation. Further, the degree of reliability of the search results calculated as described above may be indicated.

Therefore, the user can easily select and use the most reliable search results containing the query word.

Although it has been illustrated that the reliability calculation process is performed for all of the search results from the search process, a degree of reliability may be only given to search results satisfying a prescribed condition among the search results.

Even though the contents search is performed for the contents posted in the communities in the embodiment of the present invention, the present invention is not limited to this. For example, reliable contents may be obtained by applying the search method according to the embodiment of the present invention to contents posted for each of different classifiable categories on a network. Such a contents search method can be easily implemented by those skilled in the art based on the above-described embodiment, and therefore a detailed explanation thereof will be omitted.

In addition, the contents search method according to the embodiment of the present invention can be applied to a community search. For example, communities are searched for subjects pertaining to an inputted query word, and the selected communities having a greater number of recommendations, a greater number of replies to contents, a greater number of talkbacks, and a greater number of emails sent are further identified. Then a search result can be provided to users in an order of higher degree of reliability of the found communities.

On the other hand, the above-described search methods can be implemented in the form of a program stored in a computer-readable recording medium. The computer-readable recording medium may include all kinds of recording media in which data that can be read by a computer are stored, for example, CD-ROMs, magnetic tapes, floppy disks, and carrier waves (such as transmission via the Internet).

Although the embodiments of the present invention have been described in detail, it is obvious to those skilled in the art that the present invention is not restricted in the embodiments and may be modified or changed in various forms without deviating from the spirit and scope of the invention as set forth in the annexed claims and equivalents thereof.

INDUSTRIAL APPLICABILITY

As apparent from the above description, according to the embodiments of the present invention, contents posted on a network can be searched for reliable search results.

Particularly, by selecting and providing contents based on characteristics of users such as age and occupation, and especially based on reliance indexes of users who post the contents, contents provided by reliable users can be provided to other users.

In addition, according to the present invention, by searching contents based on a degree of use of contents, contents and/or search results that are used more can be selectively provided to users.

Also according to the present invention, by searching contents based on annexation of additional information to contents and/or a size of contents, contents and/or search results providing more information can be provided to users.

Furthermore, according to the present invention, by providing search results arranged in an order of higher degree of reliability, users can easily select and use reliable contents.

The invention claimed is:

1. A method of operating an on-line service, the method comprising:
   conducting a search and locating a plurality of on-line contents pertaining to a query from a user;
   determining reliability values for at least part of the plurality of on-line contents, wherein some of the plurality of on-line contents are posted by registered members of the on-line service, wherein the reliability value of each on-line content posted by a registered member of the on-line service is determined in consideration of at least one reliability evaluation variable of the registered member of the on-line service selected from the group consisting of age, gender, occupation and residential area of the registered member of the on-line service that has been submitted to the service by the registered member of the on-line service, each of the reliability evaluation variables being provided with a plurality of ranges, each of which is assigned a representative value, wherein determining a reliability value of a first one of the plurality of on-line contents comprises:
   retrieving at least one of the reliability evaluation variables for the first on-line content,
   determining which one of the plurality of ranges the at least one of the reliability evaluation variables falls within;
   retrieving the representative value of the determined range as an input value for computing the reliability value of the first on-line content, and
   computing the reliability value of the first on-line content using at least one input value;
   converting information of the located plurality of on-line content into a search result, in which the at least part of the plurality of on-line contents is arranged based on the reliability value; and
   providing the user with the search result.

2. The method of claim 1, wherein reliability values of on-line contents are determined in further consideration of the size of each located on-line content.

3. The method of claim 1, wherein reliability values of on-line contents are determined in further consideration of numbers of activities relating to each on-line content, wherein the activities relating to an on-line content are selected from the group consisting of browsing of the on-line content replies to the on-line content, and emails including the on-line content.

4. The method of claim 1, wherein reliability values of on-line contents are determined in further consideration of whether each of the located on-line contents contains multi-media data selected from the group consisting of a still image, a moving picture, and audio data.

5. The method of claim 4, wherein the still image, moving picture and audio data have different contributions for computing the reliability values of on-line contents.

6. The method of claim 1, wherein the on-line service comprises an on-line community service.

7. The method of claim 1, the converting information comprises identifying a first one of the plurality of on-line contents having a reliability value smaller than a pre-determined value, and excluding the first on-line content from the search result.

8. A system comprising a processor and a storage medium, the system further comprising:
   a search module configured to conduct a search and locate a plurality of on-line contents;
   a reliability module configured to compute reliability values for at least part of the plurality of on-line contents, wherein the reliability module is configured to compute the reliability value of a first each on-line content posted by a registered member of an on-line service in consideration of at least one reliability evaluation variable of the registered member of the on-line service selected from the group consisting of age, gender, occupation and residential area of the registered member that has been submitted to the service by the registered member of the on-line service, each of the reliability evaluation variables being provided with a plurality of ranges, each of which is assigned a representative value, wherein the reliability module is further configured:
   to retrieve at least one of the reliability evaluation variables for the first on-line content,
   to determine which one of the plurality of ranges the at least one of the reliability evaluation variables falls within;
   to assign the representative value of the determined range as an input value for computing the reliability value of the first on-line content, and
   to compute the reliability value of the first on-line content using at least one input value; and
   a search result module configured to formulate a search result and send the search result to the user in which the at least part of the plurality of on-line contents is arranged based on the reliability value.

9. The system of claim 8, wherein the reliability is configured to compute the reliability values of on-line contents in further considerations of,
   of the number of activities relating to each located on-line content, wherein the activities relating to an on-line content are selected from the group consisting of browsing the on-line content, replies to the on-line content, and emails including the on-linecontent;
   whether each located on-line content contains multi-media data selected from a group consisting of a still image, a moving picture, and audio data;, and
   a size of the each located on-line content.

10. The system of claim 8, wherein the system further comprises a search controller configured to select at least one evaluation variable.

11. The system of claim 8, further comprising:
   a search result arranging module configured to arrange at least part of the plurality of on-line contents based on the reliability values of the on-line contents.

12. The system of claim 8, further comprising:
   a first server configured to provide at least one on-line service, wherein the first server comprises a first database configured to store a plurality of on-line contents posted in the at least one on-line service and information of registered members of the at least one on-line service who posted the on-line contents, wherein the information comprises age, occupation and residential area of the registered member; and
   a second server configured to provide at least one personal web page, wherein the second server comprises a second database configured to store a plurality of on-line contents posted in the at least one personal web page and information of a person who operates the at least one personal web page, wherein the information comprises age, occupation and residential area of the person.

13. The system of claim 12, further comprising:
   a mail server configured to send emails including the on-line contents to an email address according to a request from the first or second server, wherein the first and second servers record a number of emails including the on-line contents sent by the mail server and the number of emails can be considered in determining the number of activities relating to each on-line content.

14. A method of operating an on-line service, the method comprising:
conducting a search and locating a plurality of on-line contents pertaining to a query from a user, wherein some of the plurality of on-line contents are posted by registered members of the on-line service;
determining at least one of age, gender, occupation and residential area of registered members of the on-line service as an evaluation variable for filtering the plurality of on-line contents; each of the determined reliability evaluation variables being provided with a plurality of ranges, each of which is assigned a representative value;
filtering the plurality of on-line contents using a condition set of at least one of the determined evaluation variables, thereby extracting a subset of the plurality of on-line contents satisfying the condition set;
determining reliability values of the subset of the plurality of on-line contents, wherein determining a reliability value of a first on-line content among the subset of the plurality of on-line contents comprises:
retrieving at least one of the reliability evaluation variables for the first on-line content,
determining which one of the plurality of ranges the at least one of the reliability evaluation variables falls within;
retrieving the representative value of the determined range as an input value for computing the reliability value of the first on-line content, and
computing the reliability value of the first on-line content using at least one input value:
converting information of the subset of the plurality of on-line contents by arranging the subset of the plurality of on-line contents into a search result based on the reliability value; and
providing the user with the search result.

15. A method of operating an on-line service, the method comprising:
conducting a search using a query from a user and locating a plurality of on-line contents pertaining to the query;
determining reliability values for at least part of the plurality of on-line contents, wherein each reliability value is determined in consideration of numbers of activities relating to each on-line content, wherein the activities relating to an on-line content are selected from the group consisting of browsing of the on-line content, replies to the on-line content, and emails including the on-line content, each of the activities being provided with a plurality of ranges for a number of occurrences for each of activities, each range is assigned a representative value, wherein determininci a reliability value of a first one of the on-line contents comprises:
retrieving at least one of the activities for the first on-line content;
determining which one of the plurality of ranges the number of occurrences for the at least one of the activities falls within,
retrieving the representative value of the determined range as an input value for computing the reliability value of the first on-line content, and
computing the reliability value of the first on-line content using at least one input value;
converting information of the located plurality of on-line contents into a search result, in which the at least part of the plurality of on-line contents is arranged based on the reliability value, and
providing the user with the search result.

16. The method of claim 15, wherein some of the plurality of on-line contents are posted by registered members of the service, wherein the reliability value of each on-line content posted by a registered member is determined in further consideration of at least one reliability evaluation variable of the registered member selected from the group consisting of age, gender, occupaition and residential area of the registered member that has been submitted to the service by the registered member.

17. A method of operating an on-line service, the method comprising: conducting a search and locating a plurality of on-line contents pertaining to a query from a user;
determining reliability values for at least part of the plurality of on-line contents, wherein some of the plurality of on-line contents are posted by registered members of the service, wherein the reliability value of each on-line content posted by a registered member of the service is determined in consideration of at least one reliability evaluation variable of the registered member selected from the group consisting of age, gender, occupation and residential area of the registered member that has been submitted to the service by the registered member, each of the reliability evaluation variables being provided with a plurality of ranges, each of which is assigned a representative value, wherein determining a reliability value of a first one of the plurality of on-line contents comprises:
retrieving at least one of the reliability evaluation variables for the first on-line content, determining which one of the plurality of ranges the at least one of the reliability evaluation variables falls within, retrieving the representative value of the determined range as an input value for computing the reliability value of the first on-line content, and
computing the reliability value of the first on-line content using at least one input value;
converting information of the located plurality of on-line contents into a search result, in which the at least part of the plurality of on-line contents is listed along with the reliability value or information corresponding to the reliability value; and
providing the user with the search result.

18. A system comprising a processor and a storage medium, the system further comprising:
a search module configured to conduct a search and locate a plurality of on-line contents pertaining to a query from a user;
a reliability module configured to compute reliability values for at least part of the plurality of on-line contents, wherein the reliability module is configured to compute the reliability value of a first on-line content posted by a registered member of the service in consideration of at least one reliability evaluation variable of the registered member selected from the group consisting of age, gender, occupation and residential area of the registered member that has been submitted to the service by the registered member, each of the reliability evaluation variables being provided with a plurality of ranges, each of which is assigned a representative value, wherein the reliability module is further configured:
to retrieve at least one of the reliability evaluation variables for the first on-line content, to determine which one of the plurality of ranges the at least one of the reliability evaluation variables falls within, to assign the representative value of the determined range as an input value for computing the reliability value of the first on-line content, and to compute the reliability value of the first on-line content using at least one input value; and a search result module configured to formulate a search result and send the search result to the user, in which the at least part of the plurality of on-line contents is listed along with the reliability value or information corresponding to the reliability value.

19. A method of operating an on-line service, the method comprising:

conducting a search using a query from a user and locating a plurality of on-line contents pertaining to the query;

determining reliability values for at least part of the plurality of on-line contents, wherein each reliability value is determined in consideration of numbers of activities relating to each on-line content, wherein the activities relating to an on-line content are selected from the group consisting of browsing of the on-line content, replies to the on-line content, and emails including the on-line content, each of the activities being provided with a plurality of ranges for a number of occurrences for each of the activities, each range is assigned a representative value, wherein determining a reliability value of a first one of the on-line contents comprises:

retrieving at least one of the activities for the first on-line content, determining which one of the plurality of ranges the number of occurrences for the at least one of the activities falls within, retrieving the representative value of the determined range as an input value for computing the reliability value of the first on-line content, and computing the reliability value of the first on-line content using at least one input value; converting information of the located plurality of on-line contents into a search result, in which the at least part of the plurality of on-line contents listed along with the reliability value or information corresponding to the reliability value; and providing the user with the search result.

* * * * *